US007571482B2

(12) United States Patent
Polyakov et al.

(10) Patent No.: US 7,571,482 B2
(45) Date of Patent: Aug. 4, 2009

(54) AUTOMATED ROOTKIT DETECTOR

(75) Inventors: Alexey A. Polyakov, Sammamish, WA (US); Gretchen L. Loihle, Redmond, WA (US); Mihai Costea, Redmond, WA (US); Robert J. Hensing, Jr., York, SC (US); Scott A. Field, Redmond, WA (US); Vincent R. Orgovan, Bellevue, WA (US); Yi-Min Wang, Bellevue, WA (US); Yun Lin, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 758 days.

(21) Appl. No.: 11/170,792

(22) Filed: Jun. 28, 2005

(65) Prior Publication Data

US 2006/0294592 A1 Dec. 28, 2006

(51) Int. Cl.
*G06F 12/14* (2006.01)
*G06F 11/00* (2006.01)

(52) U.S. Cl. .............................. 726/24; 726/22; 726/23; 726/25; 713/188; 709/201; 709/202; 709/217; 709/218

(58) Field of Classification Search .................... 726/24
See application file for complete search history.

(56) References Cited

U.S. PATENT DOCUMENTS 5,386,522 A 1/1995 Evans

| 5,889,988 | A | 3/1999 | Held |
|---|---|---|---|
| 6,463,583 | B1 | 10/2002 | Hammond |
| 6,754,851 | B2 | 6/2004 | Yoshimura |
| 6,769,117 | B2 | 7/2004 | Moore |
| 6,874,149 | B1 | 3/2005 | Bermudez et al. |
| 2002/0046364 | A1 | 4/2002 | Yoshimura |
| 2003/0009548 | A1 | 1/2003 | Poyner |
| 2003/0056197 | A1 | 3/2003 | Dennis et al. |
| 2004/0098639 | A1 | 5/2004 | Liu |
| 2004/0168161 | A1 | 8/2004 | Hargreaves |
| 2004/0221269 | A1 | 11/2004 | Ray et al. |
| 2004/0221271 | A1 | 11/2004 | Zeman et al. |
| 2005/0204205 | A1* | 9/2005 | Ring et al. ..................... 714/47 |

OTHER PUBLICATIONS

Levine, J.G., 'A Methodology for Detecting and Classifying Rootkit Exploits', Georgia Institute of Technology, Feb. 2004,entire document, http://etd.gatech.edu/theses/available/etd-03172004-115855/unrestricted/john_g_levine_200405_phd.pdf.*

(Continued)

*Primary Examiner*—Kambiz Zand
*Assistant Examiner*—Ronald Baum
(74) *Attorney, Agent, or Firm*—Workman Nydegger (57) ABSTRACT

Embodiments of a RootKit detector are directed to identifying a RootKit on a computer that is designed to conceal malware. Aspects of the RootKit detector leverage services provided by kernel debugger facilities to automatically obtain data in specified data structures that are maintained by an operating system. Then the data obtained from the kernel debugger facilities is processed with an integrity checker that determines whether the data contains properties sufficient to declare that a RootKit is resident on the computer.

19 Claims, 5 Drawing Sheets

OTHER PUBLICATIONS

Wang, Z., et al, 'Countering Persistent Kernel Rootkits Through Systematic Hook Discovery', Proceedings of the Recent Advances in Intrusion Detection (RAID), 2008, entire document, http://www.csc.ncsu.edu/faculty/jiang/pubs/RAID08_HookMap.pdf.*

Garfinkel, T., and M. Rosenblum, "A Virtual Machine Introspection Based Architecture for Intrusion Detection," *Proceedings of the Internet Society's 2003 Symposium on Network and Distributed System Security*, San Diego, Calif., Feb. 6-7, 2003, pp. 191-206.

"Know Your Enemy: Sebek," Honeynet.org, Nov. 17, 2003, <http://www.honeynet.org/papers/sebek.pdf> [retrieved Dec. 14, 2004].

Litty, L., "Hypervisor-Based Intrusion Detection," master's thesis, University of Toronto, Toronto, Canada, © 2005.

* cited by examiner

AUTOMATED ROOTKIT DETECTOR

BACKGROUND

As more and more computers and other computing devices are interconnected through various networks such as the Internet, computer security has become increasingly more important, particularly from invasions or attacks delivered over a network or over an information stream. As those skilled in the art and others will recognize, these attacks come in many different forms, including, but certainly not limited to, computer viruses, computer worms, system component replacements, Trojans, RootKits, spy-ware, denial of service attacks, even misuse/abuse of legitimate computer system features—all of which exploit one or more computer system vulnerabilities for illegitimate purposes. While those skilled in the art will recognize that the various computer attacks are technically distinct from one another, for purposes of the present invention and for simplicity in description, all malicious computer programs that spread on computer networks such as the Internet, will be generally referred to hereinafter as computer malware or, more simply, malware.

When a computer system is attacked or "infected" by computer malware, the adverse results are varied, including disabling system devices; erasing or corrupting firmware, applications, or data files; transmitting potentially sensitive data to another location on the network; shutting down the computer system; or causing the computer system to crash. Yet another pernicious aspect of many, though not all, computer malware is that an infected computer system is used to infect other computer systems that are communicatively connected by a network connection.

A traditional defense against computer malware and, particularly, against computer viruses and worms, is antivirus software that is available from numerous software vendors. Most antivirus software identifies malware by matching patterns within data to what is referred to as a "signature" of the malware. Typically, antivirus software scans for malware signatures when certain events are scheduled to occur, such as when data is going to be written or read from a storage device on the computer. As known to those skilled in the art and others, computer users have ongoing needs to read and write data to storage devices such as a hard drive. For example, a common operation provided by some software applications is to open a file stored on a hard drive and display the contents of the file on a computer display. However, since opening a file may cause malware associated with the file to be executed, antivirus software typically performs a scan or other analysis of the file before the open operation is satisfied. If malware is detected, the antivirus software that performed the scan may prevent the malware from being executed, for example, by causing the open operation to fail.

Increasingly, malware is being distributed with one or more programs specifically designed to "hide" the malware from software designed to protect a computer (e.g., antivirus software, anti-spyware software, and the like). Similar to other types of applications installed on a computer, software designed to protect a computer from malware relies on services provided by an operating system to search for malware. However, if a malware is able to infect components of a computer operating system, the malware may control the information that is provided to software designed to protect a computer. Malware that is specifically designed to conceal other malware on a computer will be generally referred to hereinafter as a "RootKit."

Figure 1:
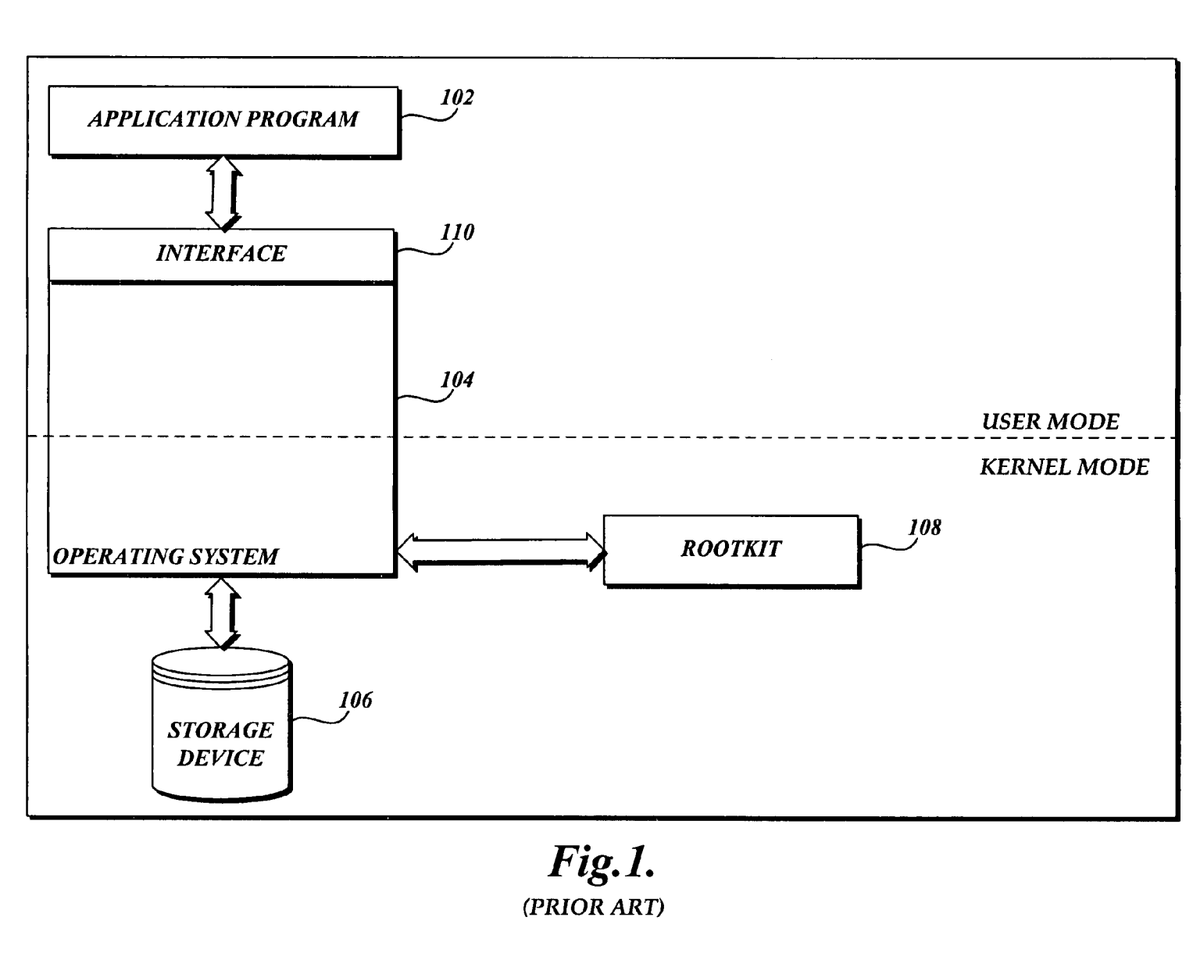
FIG. 1 is a block diagram of a computer with software components that are configured to perform functions of a modern computer and a RootKit that is designed to conceal malware.

For illustrative purposes and by way of example only, FIG. 1 depicts how a RootKit is able to control the information that is made available to software designed to protect a computer 100 from malware. As illustrated in FIG. 1, the computer 100 includes an application program 102, an operating system 104, a storage device 106, and a RootKit 108. Also, the operating system 104 includes an interface 110 that provides services in the form of an Application Programming Interface ("API") to application programs installed on the computer 100. The application program 102 performs actions designed to protect the computer 100 from malware. For example the application program 102 may scan files for malware "on access" when a user attempts to access a file stored on the storage device 106. However, as illustrated in FIG. 1, the application program 102 performs operations in user mode and relies on services provided by the operating system 104 that operates, at least partially, in kernel mode. Moreover, the computer 100 is infected with the RootKit 108 that "hooks" into the operating system 104 where it intercepts calls used to perform basic functions on the computer 100. Stated differently, the RootKit 108 acts as a "man-in-the-middle," monitoring and altering communications between the operating system 104 and application programs installed on the computer 100. If an application program attempts to list the contents of a directory containing one or more files used by the RootKit 108, the RootKit 108 will censor the file name from the list. Similarly, the RootKit 108 may hide entries in the system registry, process list, and the like, thereby controlling all of the information that the RootKit 108 wants hidden.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

The foregoing problems discussed in the Summary are overcome by a RootKit detector, embodiments of which are directed to identifying a program on a computer that is designed to conceal malware installed on the computer. More specifically, in one embodiment, the RootKit detector performs a method that leverages services provided by kernel debugger facilities to obtain data from data structures maintained by an operating system. Those skilled in the art will recognize that kernel debugger facilities allow a kernel debugger application to troubleshoot a program as it executes by stepping line-by-line through the program and providing the value of variables, registers, stacks, and the like in order to identify improper logic in the program. The kernel debugger facilities are used by the RootKit detector to automatically obtain data that is maintained by an operating system. Then the data obtained is processed with an integrity checker that determines whether the data has properties sufficient to declare that a RootKit is resident on a computer.

In another embodiment, the RootKit detector acts as a software system that searches a computer for a RootKit. More specifically, the software system includes (1) kernel debugger facilities operative to obtain data stored in data structures maintained by a computer operating system; (2) an integrity checker that determines whether data obtained by the kernel debugger facilities contains properties characteristic of a RootKit; and (3) a detection module that coordinates obtaining data maintained by the operating system with the actions performed by the integrity checker in order to automate the process of determining whether a RootKit exists on the computer.

In still another embodiment, a computer-readable medium is provided with contents, i.e., a program that causes a computer to operate in accordance with the methods described herein.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Embodiments of a RootKit detector described herein are directed to identifying a RootKit on a computer that is designed to conceal malware that is resident on the computer. Aspects of the RootKit detector leverage services provided by kernel debugger facilities to automatically obtain data from specified data structures that are maintained by an operating system. Then the data obtained from the kernel debugger facilities is processed with an integrity checker that determines whether the data contains properties sufficient to declare that a RootKit is resident on the computer. While the RootKit detector will be described primarily in the context of identifying a malware commonly known as a "RootKit," those skilled in the art and others with recognize that the concepts described herein may be applicable in other contexts.

Now with reference to FIG. 2, a computer 200 with software components that implement a RootKit detector will be described. The computer 200 illustrated in FIG. 2 contains many of the same components of like-name described above with reference to FIG. 1. In this regard, the computer 200 includes an application program 202, an operating system 204, and a storage device 206. Also, the operating system 204 includes an interface 208, kernel debugger facilities 210, an integrity checker 212, and a detection module 214. Collectively, the components included in the operating system 204 that implement the RootKit detector provide a way to identify a RootKit that is resident on the computer 200.

The operating system 204 may be a general-purpose operating system such as a Microsoft® operating system, UNIX® operating system, or Linux® operating system. As known to those skilled in the art and others, the operating system 204 controls the general operation of the computer 200 and is responsible for management of hardware and basic system operations as well as executing application programs. More specifically, the operating system 204 insures that computer programs, such as application program 202, are able to use hardware resources like the storage device 206. Modern computers allow application programs to extend the functionality of the operating system 204 by providing mechanisms for code to execute in the memory space reserved for the operating system 204. The problem with these types of systems is that a RootKit may compromise the integrity of the data provided by the operating system 204 to application programs.

Figure 2:
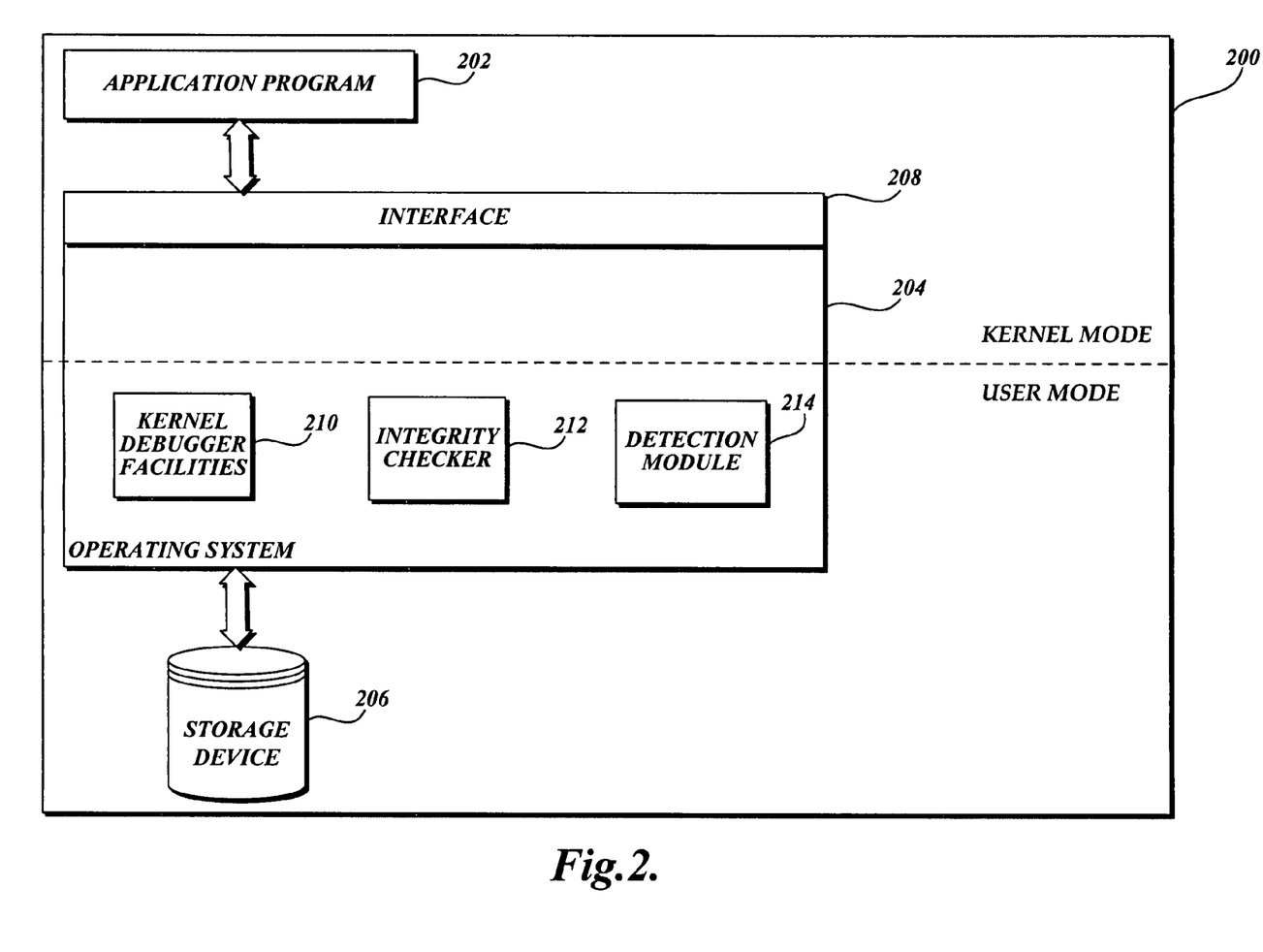
FIG. 2 is a pictorial depiction of the computer illustrated in FIG. 1 with software components that are capable of identifying a RootKit.

As illustrated in FIG. 2, the operating system 204 includes kernel debugger facilities 210 operative to obtain data stored in data structures maintained by the operating system 204. As mentioned previously, the kernel debugger facilities 210 have traditionally been used by kernel debugger applications to troubleshoot a program as it executes by stepping line-by-line through the program and providing the value of variables, registers, stacks, and the like. Typically, the kernel debugger facilities 210 are used to analyze and identify improper logic in the core components of the operating system 204 as well as drivers and kernel-mode extensions and services. In this regard, the kernel debugger facilities 210 support setting breakpoints, manipulating program execution using a variety of commands, formatting the display of operating system data structures, and the like. However, those skilled in the art and others will recognize that the kernel debugger facilities 210 include, but are not limited to, all of the services provided by an operating system, firmware, and hardware resources that have been provided to kernel debugger applications.

As described in further detail below, aspects of the RootKit detector may operate in a variety of contexts of which the following are only examples. As illustrated in FIG. 2, the kernel debugger facilities 210 may be used on a stand-alone computer 200 to obtain and analyze data in a "live debug session." In this instance, the kernel debugger facilities 210 take a "snapshot" of the data maintained by the operating system 204 and perform a read-only analysis of the data obtained to determine whether a RootKit is resident on the computer 200. If a RootKit is resident on the computer 200, aspects of the RootKit detector attempt to clean the infection by changing the configuration of the computer 200—for example, by modifying data in a system registry. Alternatively, aspects of the RootKit detector including the kernel debugger facilities 210 may be located on a remote computer or computing device (not illustrated). In this instance, a target computer, such as computer 200, maintains a connection with a host computer or computing device that stores software routines that implement the RootKit detector. The connection between the host and target computers may be direct or a network connection. In either instance, the host computer is configured to suspend execution of the target computer—for example, by using services provided by kernel debugger facilities. Then, an "online session" is initiated in which data maintained by the operating system on the target computer is analyzed to determine whether a RootKit is resident on the target computer. Moreover, data in kernel memory on the target computer may be modified by the RootKit detector so that software routines implemented by a RootKit may be bypassed. As a result, signature-based techniques for detecting and cleaning a RootKit from a computer may be employed. Finally, the RootKit detector may be used solely in the context of determining whether a target computer is infected with RootKit. For example, the RootKit detector may be configured to obtain and analyze a "memory dump" of the data maintained by the operating system on a target computer. In this instance, the kernel debugging facilities extract relevant information from the memory dump that is analyzed "offline" to determine the extent to which a network of computers has been infected with a RootKit.

As illustrated in FIG. 2, the operating system 204 also maintains an integrity checker 212 and a detection module 214. In one embodiment of the RootKit detector described herein, the integrity checker 212 and the detection module 214 are provided as an extension to the kernel debugger facilities 210. In this instance, the kernel debugger facilities 210 expose functionality, typically, in the form of library routines, to the integrity checker 212 and the detection module 214. In an alternative embodiment, the software routines that implement the RootKit detector, including the integrity checker 212 and detection module 214, are contained in a driver. In this instance, the driver is configured to communicate with one or more user-mode applications (e.g., antivirus software, anti-spyware software, system utilities, and the like) to identify programs designed to conceal malware on the computer 200 when called by the user-mode application.

In the embodiment of the RootKit detector illustrated in FIG. 2, the operating system 204 also maintains an integrity checker 212 for determining whether data obtained by the kernel debugger facilities 210 contains properties that are characteristics of a RootKit. Generally described, there are three primary techniques in which the integrity checker 212 may identify a RootKit on a computer. In one technique, the integrity checker 212 compares data as reported by the interface 208 to the actual properties as identified by the kernel debugger facilities 210. In this instance, a request is made to the interface 208 to provide data that describes the state of the computer 200. For example, a request may be made to the interface 208 to generate a report regarding files stored on the computer 200 that may include file name, size, date created, time last modified, checksum, and the like. Then the file properties as reported by the interface 208 are compared to actual file properties as identified in the data obtained by the kernel debugger facilities 210. In this regard, a more detailed explanation of a system that identifies a RootKit by comparing differences between actual and reported data may be found in commonly-assigned, co-pending U.S. patent application Ser. No. 10/997,768, filed Nov. 23, 2004, titled "Method and System for Detecting Infection of an Operating System," the content of which is expressly incorporated herein by reference.

In a second technique, heuristics are employed to analyze "suspicious modifications" that are made in data structures maintained by the operating system 204 to determine whether the modifications were generated by a RootKit. In this regard, the integrity checker 212 may identify jump instructions in unexpected locations, search for hidden processes, check references to memory addresses that are outside of a "normal" range, and the like, in order to identify behaviors that are characteristic of a RootKit. For example, some operating systems maintain a data structure—sometimes referred to as a process table—that contains a list of programs that are scheduled to be executed. Those skilled in the art and others will recognize that legitimate reasons exist for programs to read data from the process table. However, removing an entry from a process table or a similar data structure may be a strong heuristic indicator that a RootKit is attempting to conceal and malware. As described in further detail below, the RootKit detector may use the kernel debugger facilities 210 to set breakpoints when a modification to a kernel data structure occurs so that the entries in these data structures may be analyzed at a later point in time. Those skilled in the art and others will recognize that heuristic techniques that search for behaviors characteristic of malware are particularly effective in identifying previously unknown RootKit.

In a third technique, the integrity checker 212 employs traditional signature-based techniques for detecting a RootKit on the computer 200. For example, file data that implements a RootKit may be identified by matching patterns within the data to what is referred to as a "signature" of the RootKit. In this regard, data that is known to implement a RootKit or a characteristic subset of the data is processed with a function that converts the data into a signature that may be used to identify the RootKit. For example, data that implements a RootKit may be processed using the Message-Digest algorithm 5 ("MD5") hashing algorithm to generate a signature. Once the signature is generated, the integrity checker 212 searches data in the memory of the computer 200 for a matching signature.

The operating system 204 illustrated in FIG. 2 also contains a detection module 214. Since aspects and different embodiments of the detection module 214 are described below with reference to FIG. 3, the detection module 214 will not be described in detail here. However, generally described, the detection module 214 coordinates obtaining data maintained by the operating system 204 with checking the data for properties that are characteristic of a RootKit. Moreover, the detection module 214 performs actions to prevent the occurrence of false positives in which a benevolent application program is incorrectly identified as a RootKit.

As known to those skilled in the art and others, FIG. 2 is a simplified example of one computer 200 capable of performing the functions of the RootKit detector. Actual embodiments of the computer 200 will have additional components not illustrated in FIG. 2 or described in the accompanying text. Also, FIG. 2 shows one component architecture of software modules that may be used to identify a RootKit. Thus, the software components illustrated in FIG. 2 should be construed as exemplary and not limiting.

In accordance with one embodiment of the RootKit detector, when a "suspicious modification" is scheduled to be made in a data structure maintained by the operating system 204, the RootKit detector causes the kernel debugger facilities 210 to set a breakpoint before the modification is completed. Those skilled in the art and others will recognize that the state of the computer 200 where the breakpoint is set may be re-created at a later point in time. By using the kernel debugger facilities to set a breakpoint before a suspicious modification is made, the RootKit detector is able to "rollback" the state of a computer in order to more accurately determine whether a RootKit is resident on the computer.

Now with reference to FIG. 3, an exemplary embodiment of a detection module 214 illustrated in FIG. 2 that determines whether a RootKit is resident on a computer will be described.

Figure 3:
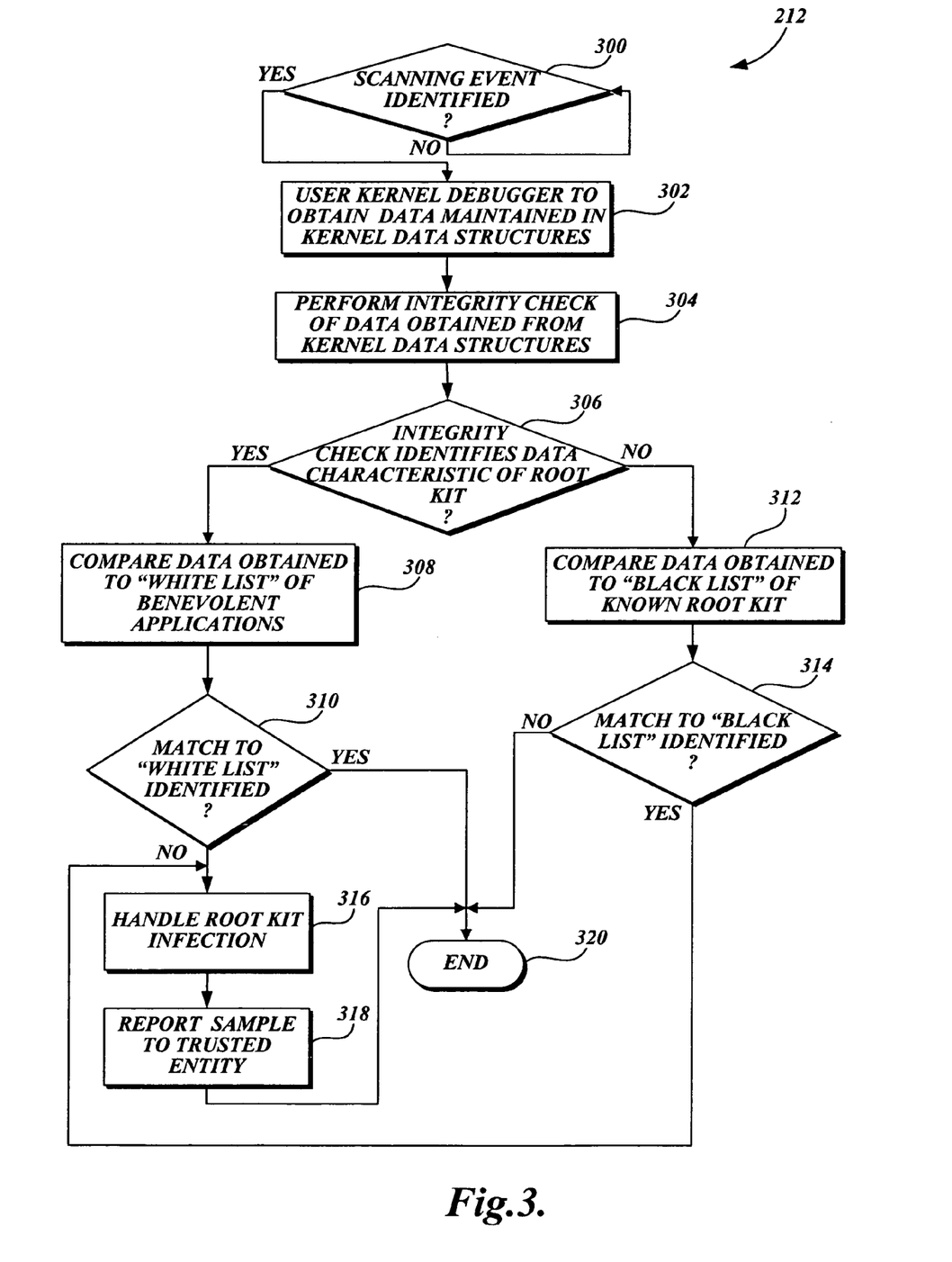
FIG. 3 is a flow diagram illustrating one exemplary embodiment of a method that is capable of identifying a RootKit that is resident on a computer.

As illustrated in FIG. 3, the detection module 214 begins at decision block 300 where it remains idle until a scanning event is identified. Those skilled in the art and others will appreciate that programs designed to protect a computer from malware may initiate a scan for malware in many different circumstances. For example, existing programs in which the RootKit detector may be integrated, such as antivirus software, anti-spyware software, system utilities and the like, may be configured to perform a scan for malware "on demand" when a user or software system generates a command using a Graphical User Interface or similar input system. However, as mentioned previously, a scan for malware may also be performed "on access" when a user or software system selects an application program for execution. Since executing an application program may expose a computer to malware, the scan is performed before execution is initiated. However, those skilled in the art and others will recognize that the scanning events described above should be construed as exemplary and not limiting as the detection module 214 may begin functioning in other instances not described herein.

At block 302, the detection module 214 causes the kernel debugger facilities to obtain data in specified data structures maintained by the operating system. At block 302, entries in data structures that have a high probability of being modified by a RootKit are obtained using the kernel debugger facilities. When the data is obtained, it is available to a software module that performs an integrity check in order to determine whether a RootKit is resident on the computer. Significantly, the functionality of the kernel debugger facilities may be exposed to the detection module 214 as a set of routines so that the data may be obtained automatically without requiring input from a user or software developer. Moreover, since the kernel debugger facilities may directly access data in the data structures without using an Application Programming Interface, a RootKit that "hooks" into the operating system or otherwise intercepts calls made to the operating system is bypassed. As a result, using the kernel debugger facilities to obtain the necessary data prevents malware that uses traditional techniques from altering the data before the properties of the data may be analyzed.

As illustrated in FIG. 3 at block 304, the detection module 214 causes an integrity check to be performed on the data obtained by the kernel debugger facilities at block 302. As mentioned previously, one aspect of the RootKit detector is a software module (e.g., the integrity checker 212) that is configured to perform an integrity check on data maintained by an operating system to determine whether a RootKit is resident on a computer. For example, a data structure typically known as a process table is used by modern operating systems to track programs that are actively performing operations on a computer (e.g., processes). Those skilled in the art and others will recognize that a process table contains all of the information that is saved when a Central Processing Unit ("CPU") switches from executing one process to another process in an operating system that supports multitasking. The information in the process table allows a suspended process to be restarted at a later time as though the process had not been suspended. Frequently, a RootKit will obscure a malware process by "hooking" into one or more API calls that access the process table. Thus in this example, the integrity checker 212 performs an analysis that compares the data obtained by the kernel debugger facilities, at block 302, which contains the actual contents of the process table, with data that is returned in response to an API call that may have been modified by a RootKit. If data obtained by the kernel debugger facilities contains a reference to a process that is not identified in response to the appropriate API call, then the computer is infected with a RootKit. However, it should be well understood that the example provided above should be construed as exemplary and not limiting. For example, as mentioned previously with reference to FIG. 2, the integrity checker 212 is also configured to analyze data for purposes of RootKit detection using other types of techniques such as traditional signature-based scanning techniques and heuristics.

While blocks 302 and 304 are illustrated in FIG. 3 as being performed sequentially; in alternative embodiments, the detection module 214 coordinates an exchange of information between a kernel debugger facilities and the software module that performs an integrity check (e.g., the integrity checker 212). For example, the integrity checker 212 may perform an analysis at block 304 and determine that additional data is needed to accurately determine whether a RootKit is resident on a computer. In this instance, the detection module 212 may proceed back to block 302 so that kernel debugger facilities may obtain additional data. By way of another example, the integrity checker 212 may perform an integrity check at block 304 and determine that entries in a data structure when a breakpoint was set are needed to determine whether a RootKit is resident on a computer. In this instance, the detection module 212 may proceed back to block 302 and cause the kernel debugger facilities to obtain data from a data structure that represents the state of the computer at a previous point in time.

At decision block 306, the detection module 212 determines whether the integrity check performed at block 304 identified a RootKit that is concealing malware on the computer. In one embodiment, the software module that performed the integrity check (e.g., the integrity checker 212) notifies the detection module 212 when data characteristic of RootKit is identified using techniques that are generally known in the art. If the detection module 212 is not notified that a RootKit is resident on the computer, then the detection module 212 proceeds to block 312 described below. Conversely, if data characteristic of a RootKit was identified, the detection module 212 proceeds to block 308.

At block 308, the detection module 212 compares data obtained by the kernel debugger facilities at block 302 with a "white list" of good or benevolent application programs. Those skilled in the art and others will recognize that legitimate application programs frequently perform operations that "hook" into an operating system to perform legitimate operations. For example, antivirus software will typically intercept a file open command to scan data in the selected file for malware before the command is satisfied. Since legitimate application programs frequently perform actions that are similar to the actions that are performed by a RootKit, "false positives" or instances in which a RootKit is incorrectly identified have been known to occur. To prevent the occurrence of false positives, the detection module 212 compares data obtained by the kernel debugger facilities with a set of data that represents a "white list" of benevolent applications. For example, in one embodiment, the data obtained by the kernel debugger facilities at block 302 is processed with a hash function to generate a signature that uniquely represents the software state of a computer. Then, the signature is compared to a "white list" of signatures generated using the same technique on computers with a legitimate application program installed. In this regard, developers generate a "white list" of signatures by identifying legitimate application programs that perform "hooking" operations that may be incorrectly identified as a RootKit. Since techniques for generating a signature using a hash function are generally known in the art, further description of this technique will not be provided here.

At decision block 310, the detection module 212 determines whether a match to a signature maintained in a "white list" was identified a block 308. If a match was identified, then the detection module 212 determines that a RootKit is not resident on the computer and proceeds to block 320 where it terminates. Conversely, if a match was not identified, the detection module 212 proceeds to block 316 described below.

At block 312, the detection module 212 compares data obtained by the kernel debugger facilities at block 302 with a "black list" of application programs that are known to be a RootKit. Aspects of the RootKit detector described herein are configured to identify RootKit that conceals malware using a plurality of techniques. In one technique, described above with reference to block 304, data available from an operating system is analyzed for inconsistencies. In another technique, employed at block 312, a signature generated from data that represents the current state of a computer is compared to signatures generated using the same technique on known RootKit. In one embodiment, the data obtained by the kernel debugger facilities at block 302 is processed with a hash function to generate a signature. Then, the signature is compared to a "blacklist" of signatures generated using the same technique from computers infected with known RootKit.

At decision block 314, the detection module 212 determines whether a match to a signature maintained in a "black list" was identified a block 310. If a match was identified, then the detection module 212 determines that a RootKit is resident on the computer and proceeds to block 316 described below. Conversely, if a match was not identified, the detection module 212 proceeds to block 320 where it terminates.

As illustrated in FIG. 3 at block 316, the detection module 212 removes any RootKit that was detected on the computer. One technique for removing RootKit from a computer includes, but is not limited to (1) "killing" or terminating processes associated with the RootKit, (2) removing RootKit generated entries in configuration files such as the system registry, and (3) deleting files that contain RootKit program code and data. However, those skilled in the art and others will recognize that a RootKit may be removed from a computer using other techniques and that the examples described above should be construed as exemplary and not limiting.

As illustrated in FIG. 3, a RootKit sample is reported to a remote computer associated with a trusted entity at block 318. As described previously with reference to block 304 (FIG. 3), aspects of the RootKit detector obtains data that describes the state of a computer. If block 318 is reached, a RootKit was detected on the computer that implements a RootKit detector. In this instance, data obtained that describes the state of the computer infected with RootKit is reported to a trusted entity so that developers may perform an analysis of the data. In one embodiment, the data is reported in an open and extensible format so that third-party application programs may cause a RootKit sample to be transmitted to the trusted entity.

The detection module 212 described with reference to FIG. 3 is one exemplary embodiment of a software module configured to automatically search a computer for a RootKit. Those skilled in the art and others will recognize that additional steps may be added to the detection module 212 without departing from the scope of the concepts described herein. Similarly, in alternative embodiments, the detection module 212 may function with fewer steps than described above or with steps performed in a different order.

Figure 4:
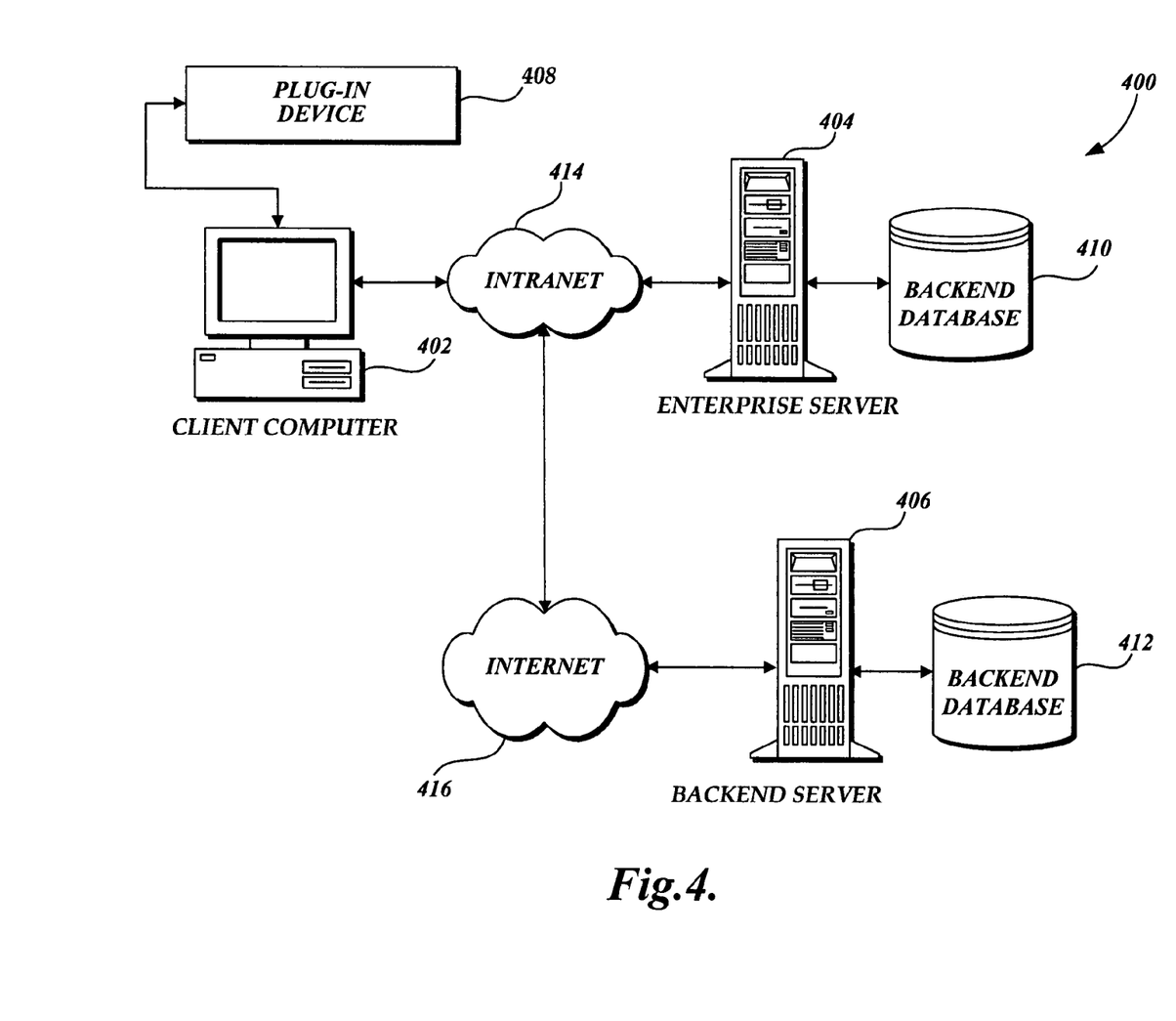
FIG. 4 is a pictorial depiction of a computer environment in which a RootKit detector may be implemented to identify and remove a RootKit from a computer.

Referring to FIG. 4, the following is intended to provide an exemplary overview of one suitable computer environment 400 in which different aspects of the RootKit detector may be implemented. The illustrated computer environment 400 is comprised of a client computer 402, an enterprise server 404, and a backend server 406. As further illustrated in FIG. 4, the client computer 402 is associated with a plug-in device 408 that is communicatively connected to the client computer 402. Moreover the enterprise server 404 and the backend server 406 are each associated with a backend database 410 and 412, respectively. The client computer 402 and the enterprise server 404 are communicatively connected via the intranet 414, which may be implemented as a Local Area Network ("LAN") or Wide Area Network ("WAN"). As known to those skilled in the art and others, the computers connected to the intranet 414 may be configured to exchange documents, commands, and other types of data over the intranet 414. Also, as illustrated in FIG. 4, the backend server 406 is communicatively connected to the enterprise server 404 and the client computer 402 via the Internet 416. Similar to the intranet 414, the computers connected to the Internet 416 may be configured to exchange documents, commands, and other types of data.

The RootKit detector described herein may be implemented in a number of different contexts of which the following are only examples. In one embodiment described above with reference to FIG. 2, the RootKit detector is implemented on a stand-alone computer to search the computer for a RootKit. In other embodiments, logic for implementing the RootKit detector is contained on a separate device or computer that does not rely on components installed on the computer that is being analyzed for RootKit. In this regard, the logic of the RootKit detector that searches the computer 402 may be located on the plug-in device 408 that is connected to the computer 402 using any number of direct communication interfaces including, but not limited to, a serial interface, parallel interface, Firewire or other "peer-to-peer" based interface, Universal Serial Bus ("USB") or other "master/slave" based interface, and the like. By having the logic that implements the RootKit detector on the plug-in device 408, a RootKit may be identified without relying on software components in an operating system that may have been compromised by a RootKit.

In an alternative embodiment, the RootKit detector is contained on a remote computer. In this regard, the RootKit detector uses network communication protocols that are generally known in the art to obtain data needed to determine whether a computer is infected with a RootKit. For example, the enterprise server 404 may initiate an "online session" so that data structures maintained on the client computer 402 may be analyzed for properties characteristic of a RootKit. In this instance, a software component on the enterprise server 404 suspends execution of the client computer 402 in order to initiate the session. Then, using kernel debugger facilities on the enterprise server 404, entries in data structures maintained by the client computer 402 are identified and transmitted to the enterprise server 404 over the intranet 414.

In another alternative embodiment, a "memory dump" file that contains the contents of data structures maintained by the client computer 402 is transmitted to a remote computer. For example, a memory dump file generated from the client computer 402 may be transmitted over the intranet 414 to the enterprise server 404 for storage in the backend database 410. Similarly, a memory dump file may be transmitted over the Internet 416 to the backend server 418 where it is stored in the backend database 412. In this embodiment, data in the memory dump files transmitted from one or more remote computers may be automatically analyzed by the RootKit detector. In this regard, the memory dump files may be processed in bulk to determine whether a RootKit is spreading over a communication network.

Now with reference to FIG. 5, another alternative embodiment of the RootKit detector in which the backend server 406 is used to search a computer for a RootKit will be described. One system that facilitates the communication of data between computers using protocols developed for the Internet is a Web service. Those skilled in the art and others will recognize that a Web service refers to a software system with a network accessible interface that performs actions on behalf of other software systems. A Web service is typically accessed using standard protocols such as the Simple Object Access Protocol ("SOAP"). A software system located on a remote computer may interact with a Web service in a manner prescribed by definitions that are provided in a service description. Also, interactions between software systems typically occur using Extensible Markup Language ("XML") based messages exchanged via Internet-based protocols such as the HyperText Transfer Protocol ("HTTP"). In this way, a Web service may expose processes to a remote computer in order to execute operations on a computer or cluster of computers that provide the Web service. Typically, a Web service supports interactions with other software systems at a specified location on a network that may be identified using a Uniform Resource Indicator ("URI").

Figure 5:
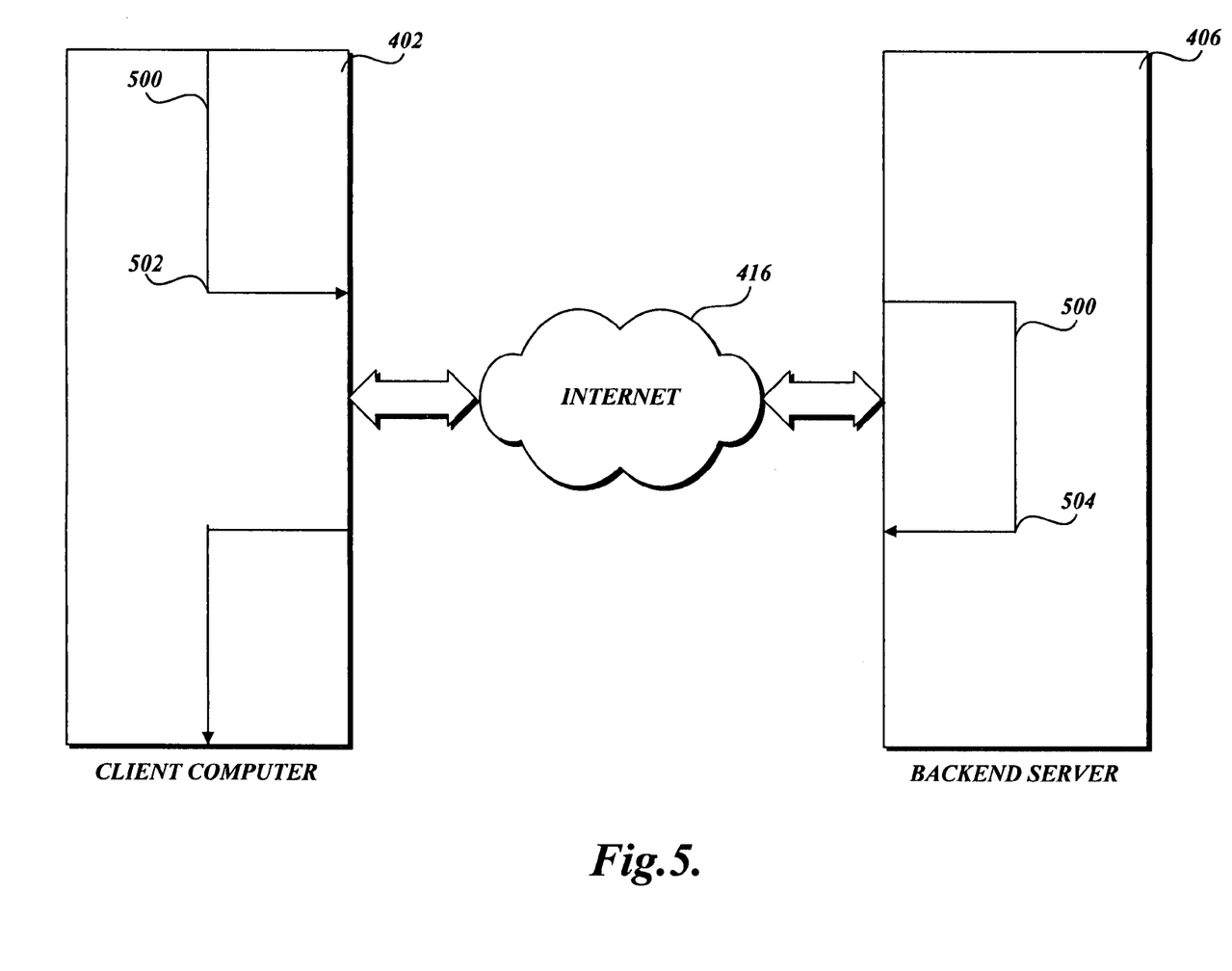
FIG. 5 is a pictorial depiction of another computer environment in which a RootKit detector may be implemented to identify and remove a RootKit from a computer.

FIG. 5 and the following discussion is intended to provide a general description of a Web service that analyzes data received from a remote computer in order to determine whether the remote computer is infected with a RootKit. As illustrated in FIG. 5, the client computer 402 and the backend server 406 are communicatively connected via the Internet 416. As further illustrated in FIG. 5, the client computer 402 maintains an exemplary flow 500 of program execution. Prior to the infrastructure of modern networks, programs were executed entirely on a single computer. However, those skilled in the art and others will recognize that a Web service provides "black-box functionality" that allows program execution to be distributed over a plurality of computers. For example, an application executing on one computer, such as the client computer 402, may invoke a function on a computer that provides the Web service at event 502 by issuing a request. As a result, the flow 500 of program execution is transferred from the client computer 402 to the backend server 406.

In this instance, invoking the function will cause program code to be executed on the backend server 406. When the function invoked on the Web service completes at event 504, the flow 500 of program execution is transferred back to the client computer 402. Typically, the Web service will cause data in the form of a response to be transmitted to the client computer 402 using standard network protocols.

In one embodiment, the client computer 402 issues a request to the backend server 406, when the client computer 402 needs to be searched for a RootKit. Using kernel debugger facilities, the backend server 406 obtains data maintained in data structures on the client computer 402. Then in response to the request, the backend server 406 performs an analysis of the data obtained to determine whether the client computer 402 is infected with a RootKit. Finally, a response is transmitted from the backend server 406 to the client computer 402 that indicates whether a RootKit was identified.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. In a computer that comprises
   an operating system, a method of identifying a program configured to conceal malware installed on the computer, the method comprising:
      employing kernel debugger facilities to obtain data maintained by the operating system by causing the kernel debugger facilities to set a break point when a suspicious activity inclusive of a characteristic of a RootKit is identified; and
      checking the data, representing contents of a data structure when the breakpoint was set, and obtained by the kernel debugger facilities, for inconsistencies that are characteristic of a program that conceals malware,
   wherein the computer includes a computer-readable storage medium comprising the kernel debugger facilities executable by the computer.

2. The method as recited in claim 1, wherein the kernel debugger facilities are exposed to other software modules on the computer as a set of library routines.

3. The method as recited in claim 2, wherein checking the data obtained by the kernel debugger facilities for inconsistencies that are characteristic of a program that conceals malware is performed in an extension to the kernel debugger facilities.

4. The method as recited in claim 1, wherein the kernel debugger facilities are located on a device that maintains a direct connection with the computer; and
   wherein data requested by the kernel debugger facilities is transmitted to the device that maintains the direct connection using an interface for communicating over the direct connection.

5. The method as recited in claim 1, wherein the kernel debugger facilities are located on a remote computer; and
   wherein data requested by the kernel debugger facilities is transmitted to the remote computer over a network connection.

6. The method as recited in claim 5, wherein checking the data obtained by the kernel debugger facilities for inconsistencies that are characteristic of a program that conceals malware is performed on a remote computer as a Web service.

7. The method as recited in claim 1, wherein checking the data obtained by the kernel debugger facilities for inconsistencies that are characteristic of a program that conceals malware is performed in a driver that may be accessed by a user-mode application program.

8. The method as recited in claim 1, wherein checking the data obtained by the kernel debugger facilities for inconsistencies that are characteristic of a program that conceals malware comprises:
   using a hash function to generate a signature from the data obtained by the kernel debugger facilities that identifies the state of the computer;
   comparing the signature to a signature generated from a computer that is infected with a RootKit; and
   comparing the signature to a signature generated from a computer that contains a benevolent program that intercepts communications made to the operating system.

9. The method as recited in claim 1, wherein checking the data obtained by the kernel debugger facilities for inconsistencies that are characteristic of a program that conceals malware comprises using heuristics to quantify characteristics that are associated with RootKit by setting a breakpoint when a modification is made to a process table.

10. A computer-readable medium bearing computer-executable instructions that, when executed on a computer that comprises
    an operating system, causes the computer to:
       set a breakpoint when a suspicious activity inclusive of a characteristic of a RootKit is identified;
       in response to the occurrence of a scan event, employ kernel debugger facilities to obtain data maintained by the operating system when the breakpoint was set; and
       determine whether the data obtained by the kernel debugger facilities contains inconsistencies that are characteristic of a RootKit;
    wherein the computer-readable medium comprises a computer-readable storage medium comprising the kernel debugger facilities.

11. The computer-readable medium as recited in claim 10, wherein if inconsistencies that are characteristic of a RootKit are identified, the computer-readable medium is further configured to cause the computer to remove the RootKit from the computer.

12. The computer-readable medium as recited in claim 11, wherein removing the RootKit from the computer comprises:
    terminating a process associated with the RootKit, removing RootKit generated entries from configuration files; and deleting a file that contains program code that implements the RootKit.

13. In a computer that comprises an operating system, a software system for identifying a program designed to conceal malware installed on a computer, the software system comprising:

kernel debugger facilities operative to obtain data in data structures maintained by the operating system by setting a break point when a suspicious activity inclusive of a characteristic of a RootKit is identified;

an integrity checker for determining whether data obtained by the kernel debugger facilities when the breakpoint was set contains inconsistencies characteristic of the RootKit;

a detection module that coordinates obtaining data maintained by the operating system and providing the data to the integrity checker; and a computer-readable storage medium comprising the kernel debugger facilities, integrity checker and detection module executable by a computer.

14. The software system as recited in claim 13, further comprising an interface for communicating with application programs installed on the computer; and wherein the integrity checker determines whether data obtained by the kernel debugger facilities contains inconsistencies characteristic of a RootKit by comparing data reported by the interface with data obtained by the kernel debugger facilities.

15. The software system as recited in claim 13, wherein the detection module is contained in a driver and the functionality of the detection module is exposed to a user mode application program.

16. The software system as recited in claim 13, wherein the detection module is further configured to generate a unique signature from data in memory of the computer for comparison to signatures generated from a known Rootkit.

17. The software system as recited in claim 16, wherein the detection module is further configured to compare the signature of the data obtained by the kernel debugger facilities to a signature generated from a computer infected with a RootKit.

18. The software system as recited in claim 13, wherein the integrity checker uses heuristics in determining whether data obtained by the kernel debugger facilities contains inconsistencies characteristic of a RootKit by setting a breakpoint when a modification is made to a process table.

19. The software system as recited in claim 14, wherein the integrity checker checks references to memory addresses that are outside of a normal range in determining whether data obtained by the kernel debugger facilities contains inconsistencies characteristic of a RootKit.

* * * * *